（12） United States Patent
Künz

(10) Patent No.: US 12,297,012 B2
(45) Date of Patent: May 13, 2025

(54) PLASTIC CONTAINER COMPRISING A POURING ELEMENT

(71) Applicant: ALPLA WERKE ALWIN LEHNER GMBH & CO. KG, Hard (AT)

(72) Inventor: Johann Künz, Hard (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 425 days.

(21) Appl. No.: 17/276,475

(22) PCT Filed: Sep. 4, 2019

(86) PCT No.: PCT/EP2019/073574
§ 371 (c)(1),
(2) Date: Mar. 15, 2021

(87) PCT Pub. No.: WO2020/053044
PCT Pub. Date: Mar. 19, 2020

(65) Prior Publication Data
US 2022/0041346 A1 Feb. 10, 2022

(30) Foreign Application Priority Data
Sep. 14, 2018 (CH) ...................................... 1088/18

(51) Int. Cl.
*B65D 47/12* (2006.01)
*B29C 49/04* (2006.01)
(Continued)

(52) U.S. Cl.
CPC ............ *B65D 47/122* (2013.01); *B29C 49/04* (2013.01); *B29C 49/48* (2013.01); *B65D 1/0246* (2013.01);
(Continued)

(58) Field of Classification Search
CPC .. B65D 47/122; B65D 1/0246; B65D 23/102; B65D 47/40; B29C 49/04; B29C 49/48; B29C 49/04104; B29L 2031/7158
(Continued)

(56) References Cited

U.S. PATENT DOCUMENTS 3,935,968 A * 2/1976 Rausing ................. B65D 11/04
222/479
4,111,340 A * 9/1978 Greenhow ............. B65D 25/48
222/527
(Continued)

FOREIGN PATENT DOCUMENTS

WO 9845207 A1 10/1998
WO 0040475 A1 7/2000
(Continued)

*Primary Examiner* — Paul R Durand
*Assistant Examiner* — Michael J. Melaragno
(74) *Attorney, Agent, or Firm* — MORRISS O'BRYANT COMPAGNI CANNON, PLLC

(57) ABSTRACT

The invention relates to a plastic container (11) comprising a blow-molded container part for receiving a filling product, comprising a container body and a container neck, wherein the container neck (17) comprises an inner wall (21) and an outer wall (23), a pouring element (25) that can be mounted on the container neck (17) and comprises a pouring opening (27), and a closure (29) by means of which the plastic container (11) can be closed. A first and second holding means (31, 45) are formed on the inner wall (21) of the container neck (17), wherein the first holding means (31) is formed so as to hold the pouring element (25) in the container neck (17) and the second holding means (45) is formed so as to hold the closure (29) in the container neck (17).

21 Claims, 4 Drawing Sheets

US 12,297,012 B2

Page 2

Figure 2:
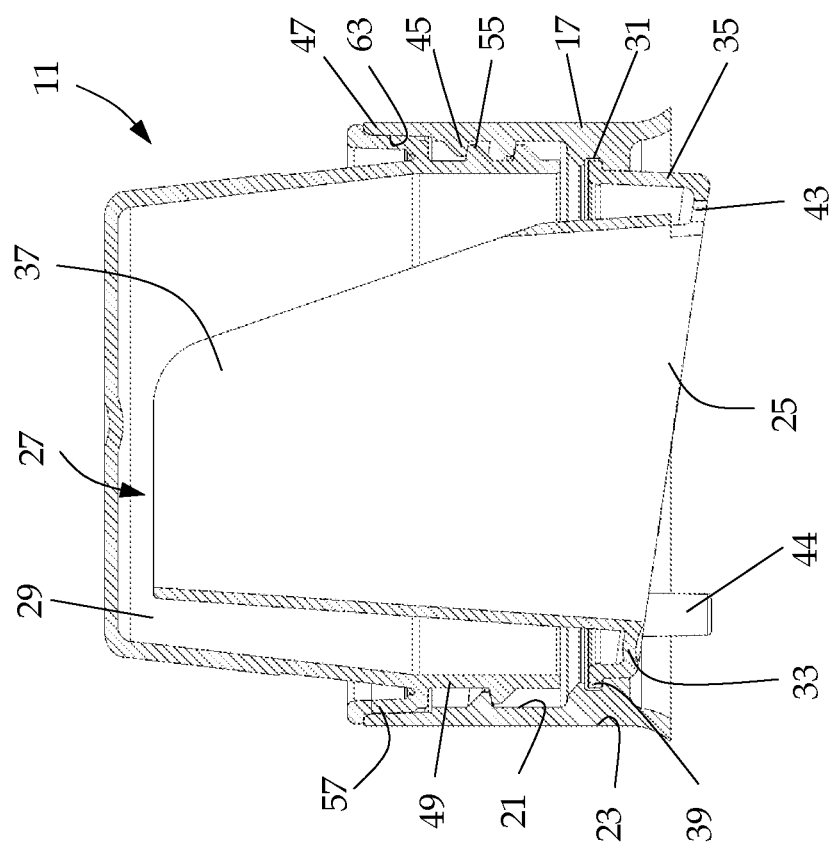

(51) Int. Cl.
| | |
|---|---|
| *B29C 49/48* | (2006.01) |
| *B29L 31/00* | (2006.01) |
| *B65D 1/02* | (2006.01) |
| *B65D 23/10* | (2006.01) |
| *B65D 47/40* | (2006.01) |

(52) U.S. Cl.
CPC ........... *B65D 23/102* (2013.01); *B65D 47/40* (2013.01); *B29C 49/04104* (2022.05); *B29L 2031/7158* (2013.01)

(58) Field of Classification Search
USPC ....................................................... 222/566
See application file for complete search history.

(56) References Cited

U.S. PATENT DOCUMENTS

| | | | | | |
|---|---|---|---|---|---|
| 4,280,434 | A | * | 7/1981 | Beckerer, Jr. | B63B 19/14 |
| | | | | | 114/174 |
| 4,550,862 | A | * | 11/1985 | Barker | B65D 47/40 |
| | | | | | 222/549 |
| 4,640,855 | A | * | 2/1987 | St. Clair | B65D 25/42 |
| | | | | | 222/572 |
| 4,671,421 | A | * | 6/1987 | Reiber | B65D 1/46 |
| | | | | | 215/44 |
| 4,696,416 | A | * | 9/1987 | Muckenfuhs | B65D 41/26 |
| | | | | | 222/545 |
| 4,711,365 | A | * | 12/1987 | Fomby | B65D 41/0428 |
| | | | | | 215/DIG. 1 |
| 4,830,234 | A | * | 5/1989 | Odet | B65D 47/122 |
| | | | | | 222/545 |
| 4,890,768 | A | * | 1/1990 | Robinson | B65D 23/06 |
| | | | | | 222/572 |
| 4,917,268 | A | * | 4/1990 | Campbell | B65D 47/40 |
| | | | | | 222/153.1 |
| 4,917,269 | A | * | 4/1990 | Fuchs | B65D 41/04 |
| | | | | | 141/381 |
| 4,929,410 | A | * | 5/1990 | Meyer | B29C 49/50 |
| | | | | | 425/525 |
| 4,981,239 | A | * | 1/1991 | Cappel | B65D 47/40 |
| | | | | | 222/572 |
| 4,989,757 | A | * | 2/1991 | Krall | B29C 49/071 |
| | | | | | 222/111 |
| 4,993,605 | A | * | 2/1991 | Del'Re | B65D 47/123 |
| | | | | | 222/545 |
| 5,020,692 | A | * | 6/1991 | Darr | B65D 23/06 |
| | | | | | 141/381 |
| 5,060,827 | A | * | 10/1991 | Segati | B65D 41/26 |
| | | | | | 141/381 |
| 5,114,659 | A | * | 5/1992 | Krall | B29C 49/70 |
| | | | | | 264/318 |
| 5,131,566 | A | * | 7/1992 | Bavegems | B65D 47/40 |
| | | | | | 141/330 |
| 5,207,341 | A | * | 5/1993 | Yeager | B65D 39/08 |
| | | | | | 215/354 |
| 5,207,356 | A | * | 5/1993 | Krall | B29C 45/26 |
| | | | | | 222/572 |
| 5,303,837 | A | * | 4/1994 | Adams | B65D 47/121 |
| | | | | | 220/276 |
| 5,431,306 | A | * | 7/1995 | Reid | B65D 47/06 |
| | | | | | 222/111 |
| 5,435,467 | A | * | 7/1995 | Ekkert | B65D 47/122 |
| | | | | | 222/143 |
| 5,462,202 | A | * | 10/1995 | Haffner | B65D 47/06 |
| | | | | | 222/571 |
| 5,498,149 | A | * | 3/1996 | Bengtsson | B29C 49/54 |
| | | | | | 249/59 |
| 5,564,603 | A | * | 10/1996 | Malmberg | B65D 51/228 |
| | | | | | 222/541.6 |
| 5,566,862 | A | * | 10/1996 | Haffner | B65D 47/06 |
| | | | | | 222/111 |
| 5,597,090 | A | * | 1/1997 | Leahy | B65D 47/123 |
| | | | | | 222/111 |
| 5,598,877 | A | * | 2/1997 | Reidel | A47K 5/13 |
| | | | | | 141/346 |
| 5,794,803 | A | * | 8/1998 | Sprick | B65D 41/265 |
| | | | | | 215/217 |
| 5,855,299 | A | * | 1/1999 | Arnold | B65D 25/48 |
| | | | | | 222/571 |
| 6,923,341 | B2 | * | 8/2005 | Smith | B65D 47/127 |
| | | | | | 222/570 |
| 6,968,980 | B2 | * | 11/2005 | Giblin | B65D 41/26 |
| | | | | | 222/571 |
| 7,097,076 | B1 | * | 8/2006 | Giblin | B65D 47/40 |
| | | | | | 222/569 |
| 7,207,466 | B2 | * | 4/2007 | Walsh | B44D 3/12 |
| | | | | | 222/569 |
| 7,686,188 | B2 | * | 3/2010 | Stebick | B65D 47/40 |
| | | | | | 222/111 |
| 7,959,034 | B2 | * | 6/2011 | Faaborg | B65D 47/06 |
| | | | | | 222/111 |
| 7,980,403 | B2 | * | 7/2011 | Martinez | B65D 39/08 |
| | | | | | 215/356 |
| 8,523,024 | B2 | * | 9/2013 | Piscopo | B65D 47/32 |
| | | | | | 222/568 |
| 10,005,214 | B1 | * | 6/2018 | Varkey | B65D 23/065 |
| 10,167,118 | B1 | * | 1/2019 | Piscopo | B65D 47/122 |
| 10,207,840 | B2 | * | 2/2019 | Sprick | B65D 1/023 |
| 10,689,158 | B2 | * | 6/2020 | Sprick | B65D 41/04 |
| 11,691,786 | B2 | * | 7/2023 | Sterling | B65D 41/26 |
| | | | | | 215/329 |
| 2005/0087548 | A1 | * | 4/2005 | Smith | B65D 47/127 |
| | | | | | 222/109 |
| 2005/0139609 | A1 | * | 6/2005 | Giblin | B65D 41/26 |
| | | | | | 222/109 |
| 2006/0131330 | A1 | * | 6/2006 | Stebick | B65D 47/40 |
| | | | | | 222/109 |
| 2008/0142547 | A1 | * | 6/2008 | Colacioppo | B65D 47/123 |
| | | | | | 222/566 |
| 2009/0045224 | A1 | * | 2/2009 | Faaborg | B65D 41/0471 |
| | | | | | 215/44 |
| 2009/0101682 | A1 | * | 4/2009 | Szekely | B65D 47/40 |
| | | | | | 222/562 |
| 2010/0043910 | A1 | * | 2/2010 | Szekely | B65D 47/06 |
| | | | | | 220/729 |
| 2011/0303698 | A1 | * | 12/2011 | Tauber | B65D 47/122 |
| | | | | | 222/111 |
| 2016/0318670 | A1 | * | 11/2016 | Piscopo | B65D 41/3423 |
| 2017/0008677 | A1 | * | 1/2017 | Dzurik | B65D 47/122 |
| 2017/0320631 | A1 | * | 11/2017 | Sprick | B65D 25/48 |
| 2018/0009580 | A1 | * | 1/2018 | Kieffer | B65D 47/40 |
| 2018/0319555 | A1 | * | 11/2018 | Sprick | B65D 51/18 |
| 2019/0135492 | A1 | * | 5/2019 | Sprick | B65D 41/04 |
| 2020/0299031 | A1 | * | 9/2020 | Sprick | B65D 41/04 |
| 2022/0041346 | A1 | * | 2/2022 | Künz | B29C 49/48 |

FOREIGN PATENT DOCUMENTS

| | | | |
|---|---|---|---|
| WO | 2007092866 A2 | 8/2007 | |
| WO | WO-2020053044 A1 * | 3/2020 | ............ B29C 49/04 |

* cited by examiner

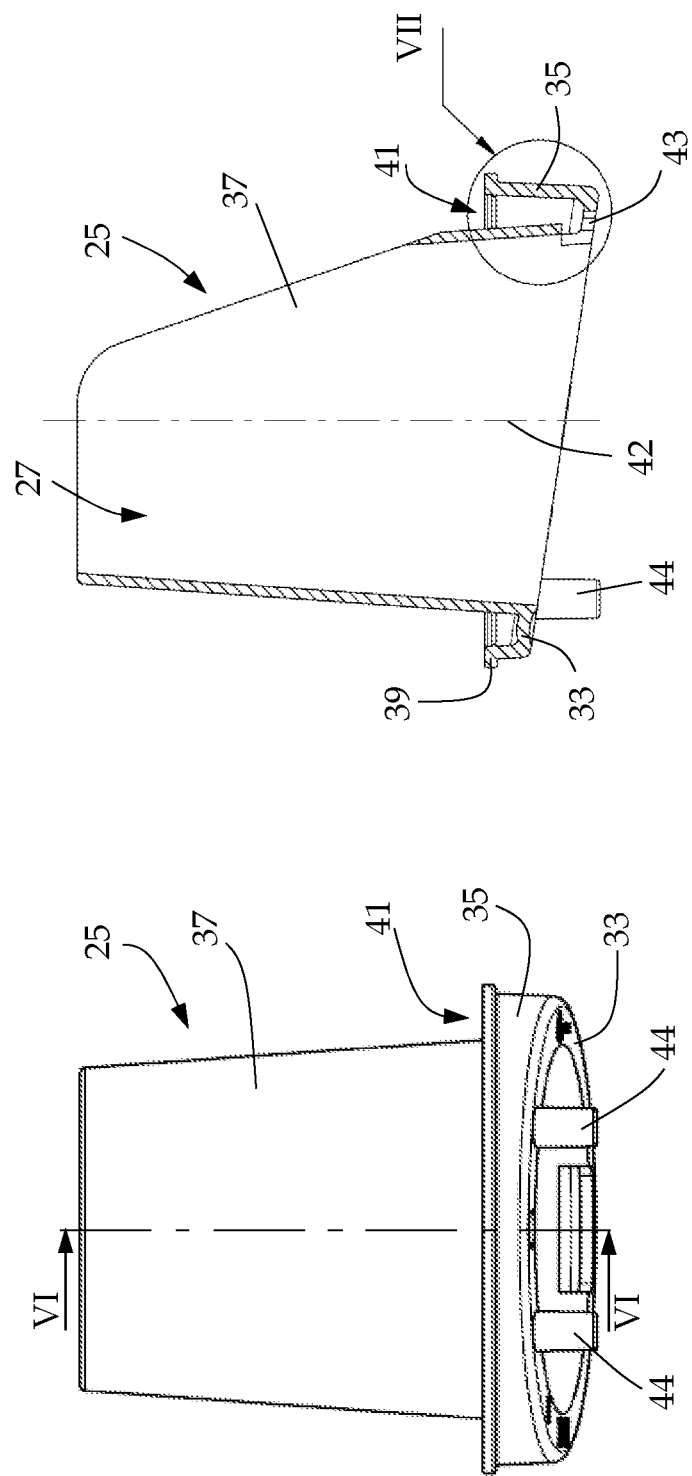

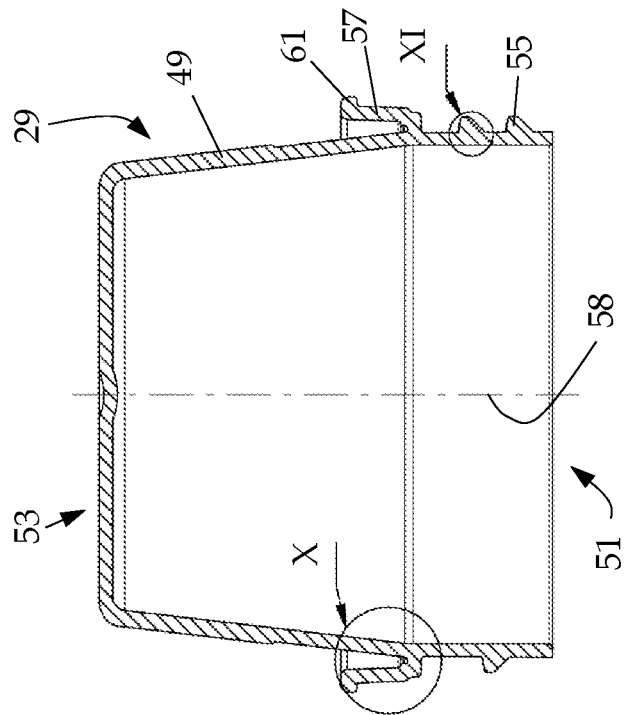
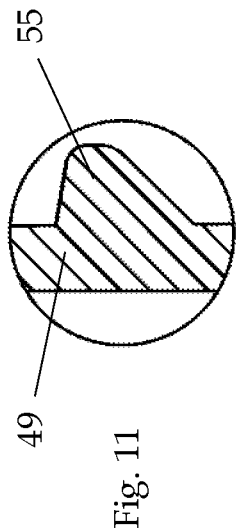
Fig. 9
Fig. 11
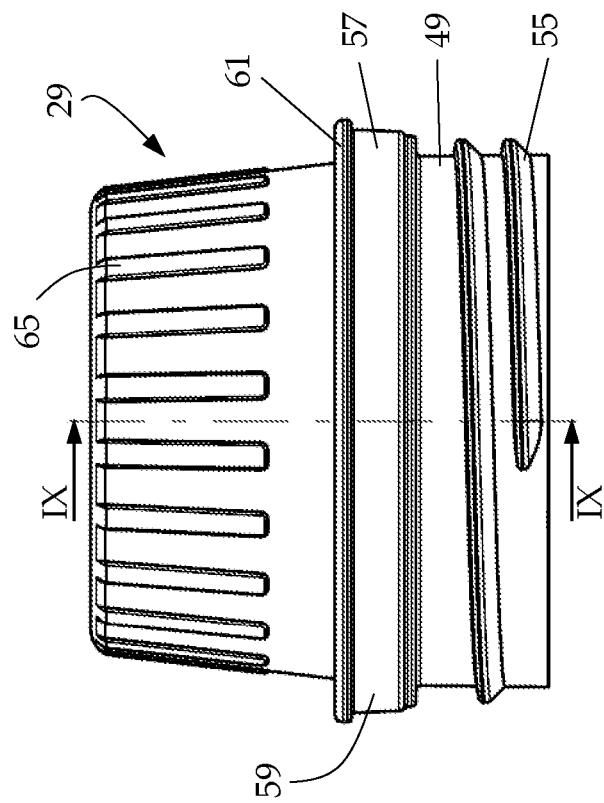
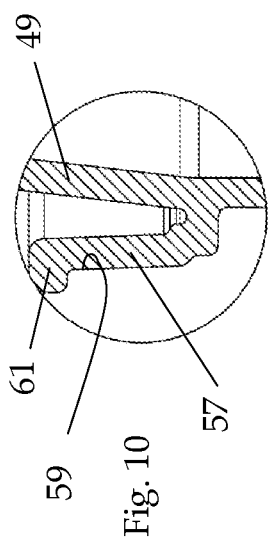
Fig. 8
Fig. 10

PLASTIC CONTAINER COMPRISING A POURING ELEMENT

CROSS-REFERENCE TO RELATED APPLICATIONS

This application is a national phase entry under 35 U.S.C. § 371 of PCT/EP2019/073574 filed Sep. 4, 2019, which claims priority to Swiss Patent Application No. 01088/18 filed Sep. 14, 2018, the entirety of each of which is incorporated by this reference.

FIELD OF INVENTION

The invention relates to a plastic container and a method for manufacturing a plastic container part.

PRIOR ART

A blow-molded plastic container which comprises a pouring element is known from the prior art. The pouring element enables, for example, fluids to be poured out of the container without spillage and enables simplified metering. In particular, containers which are used to fill liquid detergents are widely equipped with such a pouring element. For this purpose, the pouring element has a pouring spout which protrudes from the base of the pouring element. The base of the pouring element can also be formed as a drip channel. Liquid flowing down the outside of the pouring spout can be collected in the drip channel. The liquid can flow back into the container via an opening provided in the drip channel.

A first external thread is formed at the neck of the container. The pouring element comprises an internal thread, by means of which the pouring element can be screwed onto the container.

In order to be able to close the container, a second internal thread is provided on the pouring element. The interaction of the second internal thread with an external thread of a screw cap allows the screw cap to be screwed onto the pouring element. This enables the container to be closed.

From the description of this prior art it can be seen that the pouring element has a very complex structure, in particular since it must comprise two internal threads. Accordingly, it can only be produced using complex and consequently very expensive tools in an injection molding process.

ADVANTAGES OF THE INVENTION

The present invention overcomes the disadvantages of the plastic container known from the prior art by proposing a plastic container with an improved pouring element. A solution should be sought which is at least equal to the prior art in terms of user friendliness and sealing function.

DESCRIPTION

The invention provides a plastic container and method of forming a plastic container with a blow-molded container part, a pouring element and a closure as set forth in the independent claims. Further developments and/or advantageous design variants are the subject of the dependent claims.

The invention makes it possible for the pouring element to have a simplified and correspondingly cheap manufacturable shape compared to pouring elements of the prior art. The first and second holding means, which usually have to be laboriously molded at the pouring element or at the closure, are formed at the inner wall of the container neck and can be formed together in a single work step and during the blow molding of the container part. As a result, the overall manufacturing costs of the plastic container according to the invention can be significantly reduced. In addition, in the case of a pouring element according to the invention, the amount of material used is approximately 50% less than in the case of conventional pouring elements known from the prior art.

The invention is characterized in that the first holding means is formed in such a way that the first holding means and the pouring element can be locked in a form-fitting manner. The shape of the pouring element can be formed simply for fastening in the container neck. In addition, the pouring element can be locked very quickly in the first holding means by the form fit. It is therefore possible to dispense with an expensive screw connection between the pouring element and the container neck, which is unnecessary for the actual purpose of use. To use the plastic container, it is not necessary to unscrew the pouring element from the container neck and is therefore superfluous.

In a particular embodiment of the invention, the first holding means is a groove running in the circumferential direction of the inner wall. The pouring element can be locked particularly easily and quickly in the groove. It is also conceivable that instead of the groove a locking projection is formed on the inner wall, which interacts with a groove formed on the outer wall of the pouring element and running in the circumferential direction. It is also conceivable that several, in particular two, locking projections are arranged distributed over the circumference of the pouring element and which lock with a groove running in the circumferential direction of the inner wall. In order to be able to easily insert a pouring element with several locking projections into the plastic container, it can be advantageous if the internal thread for the closure is not formed all around, but has interruptions in sections that are formed in such a way that when the pouring element is inserted into the plastic container, the locking projections do not interact with the threads, i.e., cannot lock. The interruptions thus form a type of channels through which the locking projections can be guided until they reach the groove and are pushed over said groove in order to lock said groove.

Alternatively, instead of the interruptions in the internal thread, the groove running on the inner wall can be formed in such a way that it extends radially further inward in the direction of the longitudinal axis than the uninterrupted circumferential threads.

Other embodiments for the first holding means are also possible within the scope of the invention. For example, the holding means can also be embodied as a bayonet lock or in bayonet-like connection variants. Embodiments in the form of welded connections, such as laser, friction, or ultrasonic welding, is also conceivable.

The invention is also characterized in that the pouring element comprises a first cylindrical jacket, a base and a pouring spout protruding from the base within the jacket, wherein a locking projection is formed at the outer wall of the jacket which locking projection interacts with the groove, whereby a holder and a first seal are formed between the groove and the locking projection. The pouring element formed in this way can be produced with a simple and correspondingly inexpensive molding tool, for example by injection molding. The locking projection is a holding element that can be easily produced in a molding tool and is easy to demold. The sealing function between the groove and the locking projection is sufficient so that the filling product to be poured flows exclusively through the pouring spout. Since the system is open to the environment, the pressures that act on the transition between the groove and the locking projection are low. Accordingly, the primary function of the groove and the locking projection is to reliably hold the pouring element in the container neck. The requirements for this first seal are lower than the requirements for the second seal described below between the container neck and the closure, because this first seal only has to ensure that the filling product, when being drained, emerges via the pouring spout while the closure is open and not between the inner wall of the container and the pouring element.

A drip channel is formed through the jacket, the base, and the pouring spout. Filling product adhering to the outside of the pouring spout, in particular liquid detergent, can collect in the drip channel. As a result, the outside of the plastic container is not contaminated with filling product and remains permanently clean.

The base is expediently inclined relative to the longitudinal axis of the pouring element and a return flow opening is provided in the base at the lowest point relative to the longitudinal axis. The filling product collected in the drip channel can therefore flow back completely into the container body and the outer surface of the plastic container remains clean.

It has proven to be advantageous if at least one ventilation opening, for example in the form of a slot in the base of the pouring element, is provided at the base. The ventilation opening enables ambient air to be sucked into the container body while the filling product is being poured out, which leads to a uniform and uninterrupted flow of filling product.

In a further embodiment of the invention, the second holding means is an internal thread. The internal thread can be produced economically together with the groove, in particular by means of a collapsible core or also by means of sliding parts or disintegrating cores. The groove and the internal thread, which are more complex to produce than the corresponding holding means of the pouring element and the closure, can therefore be produced together in one work step. The molding tools which produce the pouring element can be formed correspondingly simply. For example, these molding tools do not have any slides which are necessary in order to form undercuts at the plastic parts. The pouring element does not have any complicated shapes, for example undercuts. Alternatively, in one embodiment of the invention, the second holding means can also be formed from a snap bead, which is formed at the inner wall instead of the threads, and formed from a corresponding counter-element to the snap bead. The counter element can be formed by snap noses which are molded onto the closure.

In a further embodiment of the invention, the closure comprises a second cylindrical jacket with an open and a closed end, wherein an external thread is formed at the outer wall of the second cylindrical jacket. The external thread interacts with the internal thread. The external thread of the closure can be produced with a simple, inexpensive molding tool. The closure can also be used as a metering device or a metering cap for the filling product.

It has proven expedient if, starting from the open end of the container neck, first the second holding means and then the first holding means are formed on the inner wall. As a result, the pouring element is inserted deeper into the container neck than the closure. The pouring element, which is usually only inserted into the container neck when the plastic container is being assembled and is always connected to the container neck during use, therefore does not prevent the closure from being screwed onto and unscrewed from the container neck.

The invention is also characterized in that at the outer wall of the second jacket, a collar with a first sealing surface extending essentially in the direction of the inner wall of the container neck is formed. Together with the container neck, the sealing surface forms a first seal so that the filling product cannot flow out of the container part. The collar can be pressed elastically inwards when it rests on the inner wall. This creates contact pressure on the inner wall, which improves the sealing function.

In a further embodiment of the invention, a flange extending in the circumferential direction is formed at the free end of the collar. When the closure is screwed into the container neck, the flange is pressed onto the open end of the container neck. The higher the screw-in torque, the higher the sealing function. The provision of the flange enables a second seal in addition to the first seal, whereby the closure can be sealed twice with respect to the container neck. It is to be understood that the flange also limits the screwing depth of the closure into the bottle neck.

It has proven to be advantageous if a second sealing surface is formed between the open end of the container neck and the first and second holding means at the inner wall. The second sealing surface can be produced with precise fit tolerances in order to form a reliable seal together with the first sealing surface.

The first and the second sealing surface are expediently dimensioned and/or oriented to one another in such a way that they correspond to one another in a manner tight to the filling product and form a second seal. By choosing the fit tolerance and the angle between the sealing surfaces, a seal can be produced which prevents the filling product from flowing out, even if the plastic container is stored horizontally or is upside down.

In a further embodiment of the invention, the first and second holding means are formed by resting at a collapsible core. The use of a collapsible core is worthwhile in the production of the container part, since the first and the second holding means can be produced simultaneously. The formation of the structures realized by the first and second holding means can therefore be omitted when producing the pouring element and the closure. As a result, these two parts can be produced much more cheaply than comparable parts of the prior art.

Because the second sealing surface is formed by resting on a rigid molding tool, the second sealing surface can have a very precise fit tolerance with respect to the first sealing surface. Such sealing surfaces cannot usually be produced with a collapsible core because a collapsible core is made up of several parts and fine ribs would form in the area of the joints between the individual core parts, which would lead to leaks. The rigid molding tool is a core with manufacturing tolerances which are predetermined by the function of the second sealing surface.

Another aspect of the invention relates to a method for producing a plastic container part, comprising a container body and a container neck, wherein the container neck comprises an inner wall and an outer wall, according to the following method steps:

extruding a hose with an extruder, transferring the extruded hose to a blow molding tool arrangement, wherein the blow mold is opened when the hose is transferred, retraction of a collapsible core which is in its spread position, closing the blow mold with compression of the section of the tube located between the collapsible core and the blow mold, whereby a first and second holding means are formed at the inner wall of the container neck, inflating the tube in the blow mold, opening the blow mold and transferring the collapsible core into its collapsed position, extending the collapsible core in the collapsed position, and demolding the container part.

The method according to the invention makes it possible for the first and the second holding means to be produced simultaneously by the collapsible core and, as a result, for the first and second holding means to have structures which are difficult to demold.

In a particular embodiment of the invention, in addition to the collapsible core, a rigid molding tool is retracted on the side of the tube on which the container neck is formed and then it is extended after the tube has been inflated, thereby forming a sealing surface on the inner wall of the container neck. By providing the rigid molding tool, the sealing surface can be produced with very precise manufacturing tolerances, which cannot be achieved with the collapsible core.

Further advantages and features emerge from the following description of an exemplary embodiment of the invention with reference to the schematic illustrations.

Figure 1:
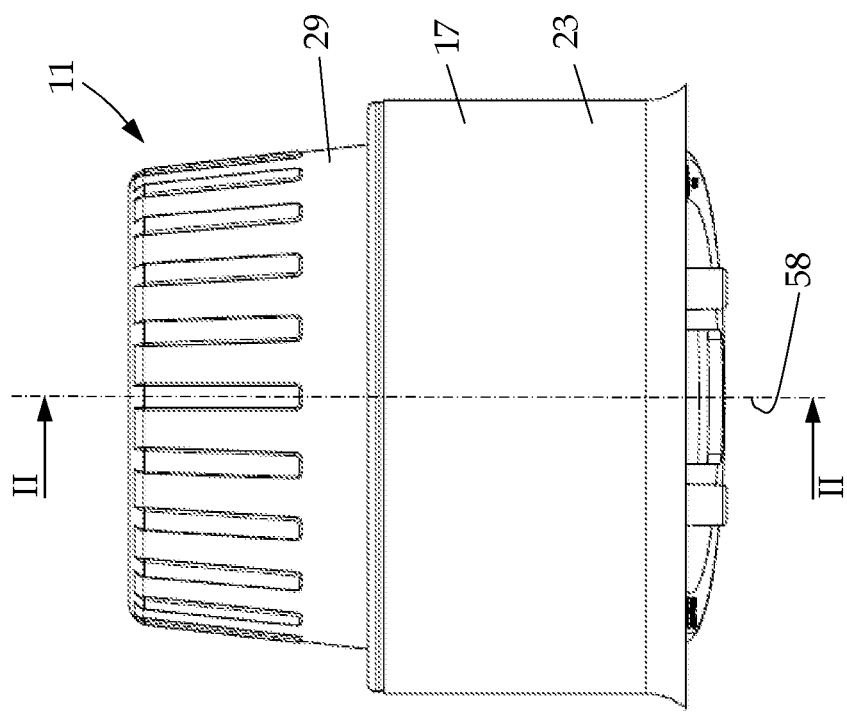
Figure 4:
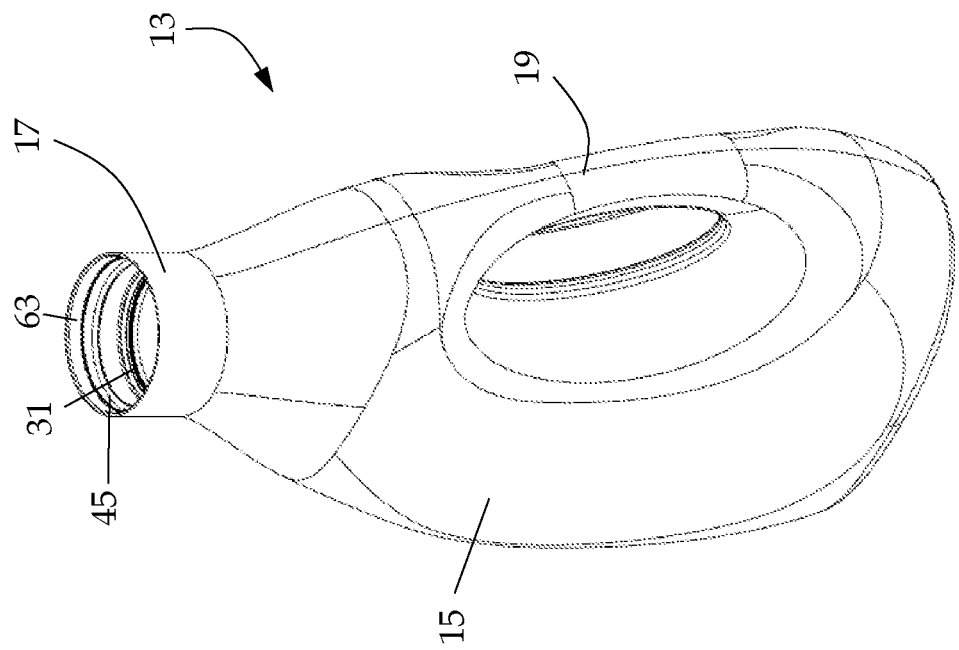
Figure 3:
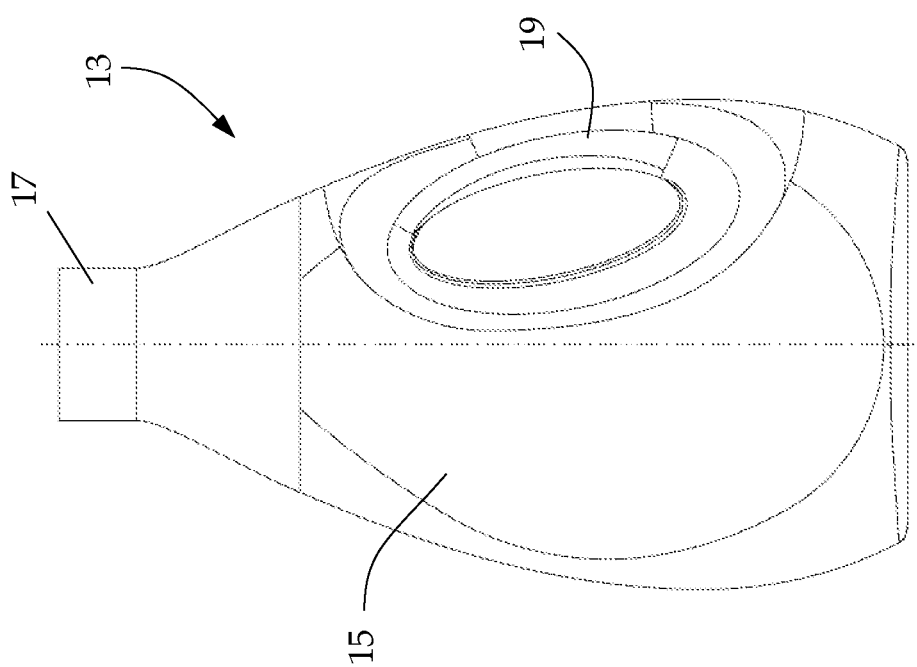

Not to scale:

FIG. 1: shows a side view of a plastic container with a container neck and a screwed-on closure;

FIG. 2: shows a sectional illustration along the line II-II in FIG. 1, whereby a pouring element inserted on the container neck is visible;

FIG. 3: shows a container part for receiving a filling product;

FIG. 4: shows the container part of FIG. 3 in a perspective view;

FIG. 5: shows the pouring element in a side view;

FIG. 6: shows a sectional illustration along the line VI-VI in FIG. 5;

FIG. 7: shows an enlarged view of detail VII of FIG. 6;

FIG. 8: shows the closure in a side view;

FIG. 9: shows a sectional illustration along the line XI-XI in FIG. 8;

FIG. 10: shows an enlarged view of the detail X of FIG. 9, and

FIG. 11: shows an enlarged view of detail XI of FIG. 9.

FIG. 1 and FIG. 2 show a neck section of a plastic container designated as a whole by reference numeral 11, for example a plastic bottle. The plastic container 11 comprises a blow molded container part 13 with a container body 15 and a container neck 17. The container body 15 is shown in FIGS. 3 and 4 and is used to hold a filling product, for example a liquid detergent. A handle 19 is formed on the container body 15 for the simplified transport and metering of the filling product. The container part 13 is produced in an extrusion blow molding process and consists of the plastic materials usually used for this process, such as, for example, PE, LDPE, LLDPE, HDPE or PP or mixtures of these materials and also, for example, PET-G or PCT-G. It can be constructed in one or more layers.

The container neck 17 has an inner wall 21 and an outer wall 23. A pouring element 25 is inserted into the container neck 17. The pouring element 25 has a pouring opening 27, through which filling product can be poured or emptied out of the container body 15.

A closure 29 can be screwed onto the container neck 17, as a result of which the plastic container 11 can be closed and the pouring opening 27 can be covered and the transition between the container neck 17 and the closure 29 is sealed tight in terms of the filling product.

A first holding means or structure, for example in the form of a groove 31 running in the circumferential direction, is formed on the inner wall 21. The pouring element 25 locks in groove 31 and is accordingly held in the groove 31 in a form-fitting manner. This type of fastening of the pouring element 25 at the inner wall 21 has the particular advantage that the pouring element 25 can have a simple shape and is accordingly inexpensive to produce.

The pouring element 25 comprises a base 33 which is delimited on its outer edge by a first cylindrical jacket 35 (FIGS. 2, 5, 6 and 7). A pouring spout 37 protrudes from the base 33 within the first cylindrical jacket. The actual pouring opening 27 is provided in the pouring spout 37. A locking projection 39 is formed at the outer wall of the jacket 35. The locking projection 39 runs in the circumferential direction of the jacket 35 and is formed continuously. The locking projection 39 is dimensioned in such a way that it corresponds to the groove 31 and can be inserted into it or is locked therewith. A first seal is formed between the groove and the locking projection. The sealing function between the groove 31 and the locking projection 39 is sufficient so that filling product to be poured flows exclusively through the pouring spout 37. Since the system is open to the environment, the pressures that act on the transition between groove 31 and locking projection 39 are low.

In FIG. 2 it can be seen that the groove 31 extends radially further inward in the direction of the longitudinal axis 58 than the uninterrupted circumferential threads of an internal thread 45. As a result, the pouring element 25 can be inserted from above into the container neck 17 up to the groove 31 without the locking projection 39 getting stuck on the internal thread or even locking with the threads.

Alternatively, it is conceivable, but not shown in the figures, that several, in particular two, locking projections are arranged distributed over the circumference of the pouring element, which lock with a groove running in the circumferential direction of the inner wall. In order to be able to easily insert a pouring element with several locking projections into the plastic container, it can be advantageous if the internal thread for the closure is not formed all around, but has interruptions in sections which are formed in such a way that when the pouring element is inserted in the plastic container, the locking projections do not interact with the threads, i.e., cannot lock. The interruptions thus form a kind of channels through which the locking projections can be passed until they reach the groove and are pushed over said groove in order to lock with said groove.

The first cylindrical jacket 35, the base 33 and the pouring spout 37 delimit a drip channel 41, as shown in particular in FIGS. 6 and 7. Filling product flowing down the outer wall of the pouring spout 37, for example liquid detergent, collects in the drip channel 41. Because the base 33 is inclined relative to the longitudinal axis 42, the filling product can collect at the lowest point of the base 33. The filling product, which has been collected in the drip channel 41, can flow back into the container body 15 through a backflow opening 43, which is provided at the lowest point of the base 33.

Feet 44 are provided at the base 33. The feet 44 therefore make it possible for the pouring element to be placed upright on a flat surface, wherein the two feet together with the lower region of the backflow opening form the support points on such a surface. As a result, the pouring element 25 can be provided in an upright position and the container part 13 can be completed with the pouring element 25 automatically, for example with a robot.

The pouring element is produced by injection molding or compression molding and consists of the plastic materials usually used for this process, such as, for example, PE, LDPE, LLDPE, HDPE or PP or mixtures of these materials.

A second holding means or structure, in the form of an internal thread 45, is also formed on the inner wall 21. The internal thread 45 is arranged closer to the open end 47 of the container neck 17 than the groove 31.

The closure 29, which is shown in detail in FIGS. 8 to 11, comprises a second cylindrical jacket 49 with an open end 51 and a closed end 53. An external thread 55 is formed at the outer wall of the second cylindrical jacket 49. The external thread 55 corresponds to the internal thread 45, as a result of which the closure 29 acts as a rotary closure and can be screwed into the container neck 17.

A collar 57 is formed at the outer wall of the second cylindrical jacket 49. The collar 57 has the shape of a third cylindrical jacket. The collar 57 or third cylindrical jacket extends along the longitudinal axis 58 of the closure 29 or the plastic container 11. The collar has a first sealing surface 59 formed on its outside. The sealing surface 59 runs essentially in the direction of the inner wall 21. A flange 61 is formed on the free end of the collar 57, that is to say the end which is not fixed at the second cylindrical jacket 49. When the closure 29 is screwed into the container neck 17, the flange 61 is pressed against the open end, whereby the container neck 17 is sealed off from the closure 29.

A second sealing surface 63 is formed on the inner wall 21 between the open end 47 and the internal thread 45. The second sealing surface 63 can correspond to the first sealing surface 59, so that the two sealing surfaces 59, 63 create a further seal between the container neck 17 and the closure 29 adjacent to the collar flange 61 and the open end 47. For this purpose, the two sealing surfaces 59, 63 can have a fit to one another which is clamped. One of the two sealing surfaces 59, 63 can also be oriented obliquely with respect to the other sealing surface in order to produce a sealing transition. The two sealing surfaces 59,61 therefore form a second seal, which has an improved sealing function compared to the first seal between the groove 31 and the locking projection 39. The closed plastic container 11 is therefore liquid-tight even when it is lying or upside down.

Ribs 65 or a similar structure are formed at the second jacket 49, which create an improved contact surface when the closure 29 is screwed in and unscrewed.

The closure 29 is produced by injection molding or compression molding and consists of the plastic materials usually used for this process, such as, for example, PE, LDPE, LLDPE, HDPE or PP or mixtures of these materials.

The groove 31, the internal thread 45 and the second sealing surface 63 are formed during the extrusion blow molding of the container part 13. For this purpose, the container neck 17 is pressed against a spreading collapsible core and against a rigid tool by closing a blow mold. The collapsible core bears the negative shape of the groove 31 and the internal thread 45. In order to be able to produce the second sealing surface 63 for the implementation of the sealing function with the most precise dimensions possible or with the smallest possible container dimensional tolerances, the upper part of the container neck is pressed against the rigid tool. After shaping, the collapsible core is folded and pulled out of the container neck 17 together with the rigid tool.

The invention claimed is:

1. A plastic container, comprising:
   a blow-molded container part for receiving a filling product, a container body and a container neck, wherein the container neck comprises an inner wall and an outer wall;
   a pouring element that can be mounted at the container neck and comprises a pouring opening;
   a closure configured to close the plastic container can be closed; and
   first and second holding structures formed on the inner wall of the container neck, wherein the first holding structure is formed so as to hold the pouring element in the container neck and the second holding structure formed so as to hold the closure in the container neck, the first holding structure comprising a groove running in a circumferential direction of the inner wall and the pouring element further comprising a first cylindrical jacket, a base, and a pouring spout protruding from the base inside the jacket, wherein a locking projection is formed at an outer wall of the jacket, which locking projection interacts with the groove, whereby a holder and a first seal are formed between the groove and the locking projection and the pouring element further comprising a first cylindrical jacket, a base, and a pouring spout protruding from the base inside the jacket, wherein a locking projection is formed at an outer wall of the jacket, which locking projection interacts with the groove, whereby a holder and a first seal are formed between the groove and the locking projection.

2. The plastic container according to claim 1, wherein the first holding structure is formed in such a way that the first holding structure and the pouring element can be locked in a form-fitting manner.

3. The plastic container according to claim 1, wherein the base is inclined relative to a longitudinal axis of the pouring element and further comprising a backflow opening in the base at a lowest point relative to the longitudinal axis.

4. The plastic container of claim 3, wherein the second holding structure comprises an internal thread.

5. The plastic container according to claim 4, wherein the groove extends radially further inward toward a longitudinal axis than threads of the internal thread.

6. The plastic container according to claim 4, wherein the threads of the internal thread are interrupted in sections.

7. The plastic container according to claim 1, wherein the first holding means is formed as a bayonet lock or as a welded connection.

8. The plastic container according to claim 1, wherein the closure comprises a second cylindrical jacket with an open and a closed end, wherein an external thread is formed on an outer wall of the second cylindrical jacket.

9. The plastic container according to 8, further comprising a collar with a first sealing surface extends essentially in a direction of the inner wall of the container neck and is formed at the outer wall of the second jacket.

10. The plastic container according to claim 9, further comprising a flange extending in a circumferential direction is formed at a free end of the collar.

11. The plastic container according to claim 9, further comprising a second sealing surface formed between an open end of the container neck and the first and second holding structures at the inner wall.

12. The plastic container according to claim 11, wherein the first and second sealing surfaces are dimensioned and/or oriented relative to one another in such a way that they correspond to one another in a manner tight to a filling product and form a second seal.

13. The plastic container according to claim 11, wherein the second sealing surface is formed by abutting against a rigid molding tool.

14. The plastic container according to claim 1, wherein starting from the open end of the container neck, first the second holding structure and then the first holding structure are formed at the inner wall.

15. The plastic container according to claim 1, wherein the first and second holding structures are formed by resting on a collapsible core.

16. A blow-molded container part for receiving a filling product, comprising:
   a container body and a container neck, the container neck comprising an inner wall and an outer wall; and
   first and second holding structures formed on the inner wall of the container neck, wherein the first holding structure is configured to hold a pouring element in the container neck and the second holding structure is configured to hold a closure in the container neck, wherein, starting from an open end of the container neck first the second holding structure and then the first holding structure are formed at the inner wall, the first holding structure comprising a groove running in a circumferential direction of an inner wall and the pouring element further comprising a first cylindrical jacket, a base, and a pouring spout protruding from the base inside the jacket, wherein a locking projection is formed at an outer wall of the jacket, which locking projection interacts with the groove, whereby a holder and a first seal are formed between the groove and the locking projection.

17. The container part according to claim 16, wherein the groove extends radially further inward in a direction of a longitudinal axis than threads of the internal thread.

18. The container part according to claim 17, wherein the threads of the internal thread are interrupted in sections.

19. A pouring element configured to be mounted at a container neck, comprising:
   a cylindrical jacket;
   a base;
   a pouring spout protruding from the base inside the cylindrical jacket and having a pouring opening; and
   at least one locking projection formed at an outer wall of the cylindrical jacket, which at least one locking projection is configured to interact with a holding structure of an inner wall of a container neck to thereby form a holder and a first seal between the inner wall and the at least one locking projection.

20. The pouring element of claim 19, wherein the holding structure is formed in such a way that the holding structure and the pouring element can be locked in a form-fitting manner.

21. The pouring element of claim 19, wherein the base is inclined relative to a longitudinal axis of the pouring element and further comprising a backflow opening in the base at a lowest point relative to the longitudinal axis.

* * * * *